United States Patent [19]
Frankle

[11] 3,912,112
[45] Oct. 14, 1975

[54] DEVICE FOR DAMPING THE VIBRATIONS OF BELLOWS, PARTICULARLY OF STORAGE BELLOWS FOR LIQUID PROPELLANTS FOR ROCKET ENGINES

[75] Inventor: Helmut Frankle, Heilbronn-Neckargartach, Germany

[73] Assignee: Messerschmitt-Bolkow-Blohm G.m.b.H., Germany

[22] Filed: Feb. 6, 1974

[21] Appl. No.: 440,262

[30] Foreign Application Priority Data
Feb. 10, 1973 Germany.......................... 2306571

[52] U.S. Cl. .................................. 220/85 B; 92/41
[51] Int. Cl.² ........................................ B65D 25/00
[58] Field of Search...... 220/85, 9 R, 9 A, 17, 63 R, 220/63 A, 85 R, 85 B; 92/41, 44; 138/30

[56] References Cited
UNITED STATES PATENTS
2,862,521  12/1958  Fenoglio ................................ 92/41

Primary Examiner—William I. Price
Assistant Examiner—Steven M. Pollard
Attorney, Agent, or Firm—McGlew & Tuttle

[57] ABSTRACT

A device for damping the vibrations of bellows, particularly bellows which are employed in storage tanks for liquid rocket propellants of rocket engines, comprises an outer tubular member with a bellows adapted to contain a propellant therein which is axially expandable and contractable within the tubular container. A damping device for the bellows comprises an inner wall formation made up of a plurality of circumferentially arranged segmental portions, each being arched in a radially inward direction to provide resilient contacting surfaces having crests which act inwardly against the bellows.

6 Claims, 2 Drawing Figures

DEVICE FOR DAMPING THE VIBRATIONS OF BELLOWS, PARTICULARLY OF STORAGE BELLOWS FOR LIQUID PROPELLANTS FOR ROCKET ENGINES

BACKGROUND OF THE INVENTION

1. Field of the Invention

This invention relates in general to the construction of bellows damping devices and, in particular, to a new and useful device for damping the expandable and contractable movement of a bellows, particularly of a type adapted to contain a propellant for a rocket engine, and which comprises a damping wall formed of a plurality of circumferentially arranged segmental portions which are each arched radially inwardly into engagement with the bellows.

2. Description of the Prior Art

At the present time, it is known to store liquid propellants in storage tanks, which include an inner wall formation in the form of a bellows which expands and contracts in accordance with the pressure and quantity of the propellant stored therein. With such arrangements, it is usual to discharge the propellant by the force of a fluid pressure acting on one side of the bellows to expel the propellant which is contained within the bellows from the tank. Such constructions are very advantageous in view of their function to provide a controlled discharge of the propellant during the rocket operation, but they have a tendency toward undesired vibrations, particularly in the longitudinal direction which are caused by the dynamics of the operation of the missile.

SUMMARY OF THE INVENTION

The present invention provides a damping device which permits operation of a bellows in the discharge of a propellant, for example, from a storage tank, and which operates substantially without any vibrations. With the invention, the bellows is surrounded by a damping jacket which comprises a plurality of segments or segmental portions, each of which are arched radially inwardly and each of which forms a crest area which applies against the bellows. In a preferred embodiment of the invention, the damping jacket is made of a thin walled construction, and it is located between the outer tank casing or missile shell wall, and the bellows, and the arched segmental portions bear against the outer wall of the bellows. With the inventive arrangement, there is multiple contact around the circumference of the damping wall with the bellows wall. The arching may extend over the whole length of the bellows or only over a portion thereof, and the damping wall ensures a uniform distribution of the work of friction on the exterior surface of the bellows during its back and forward movement so that the vibrations of the bellows are effectively damped. By making the damping wall of very thin walled construction, there is an advantageous saving of space and weight.

Accordingly, it is an object of the invention to provide a device for damping the vibration of bellows which comprises a wall surrounding the bellows having a plurality of circumferentially arranged segmental portions, each having an inwardly arched formation bearing against the surface of the bellows.

A further object of the invention is to provide a rocket engine or missile having a propellant storage tank which includes a bellows which contains the propellant which is expandable and contractable in the tank and which also includes a damping wall formed with a plurality of circumferentially arranged segment portions, each being arched in a radially inward direction and forming crests providing resilient contacting surfaces acting against said bellows.

A further object of the invention is to provide a bellows and a propellant storage tank construction, which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF A PREFERRED EMBODIMENT

Figure 1:
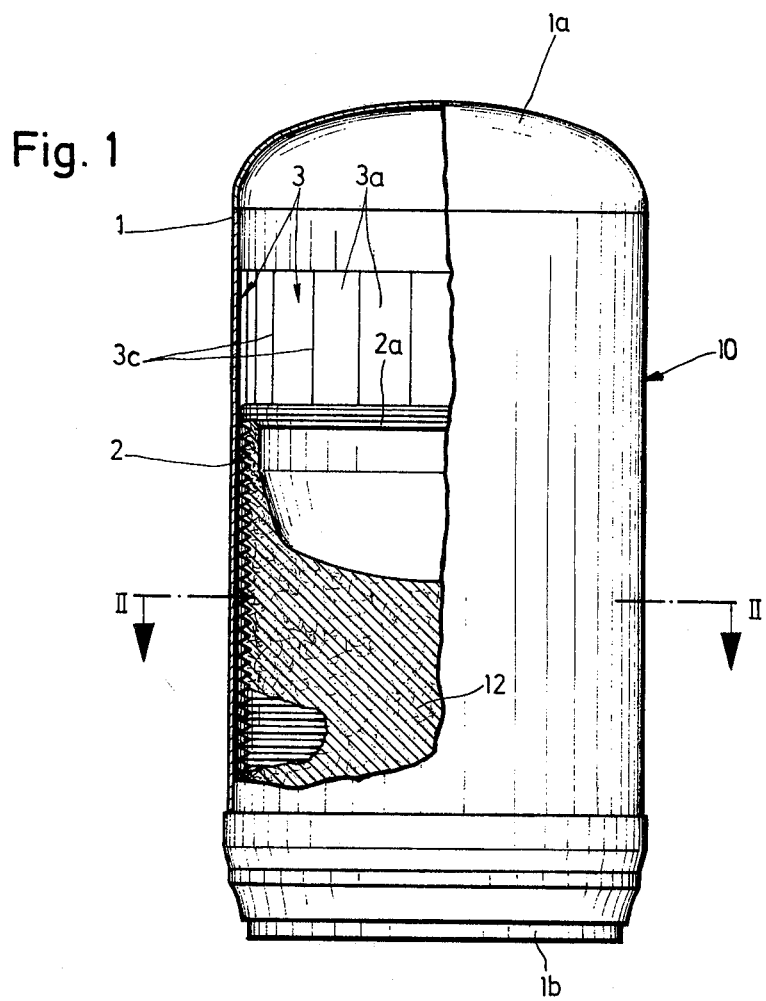
FIG. 1 is a partial elevational and partial sectional view of a propellant tank for a rocket engine having a bellows therein and a damping jacket constructed in accordance with the invention.
Figure 2:
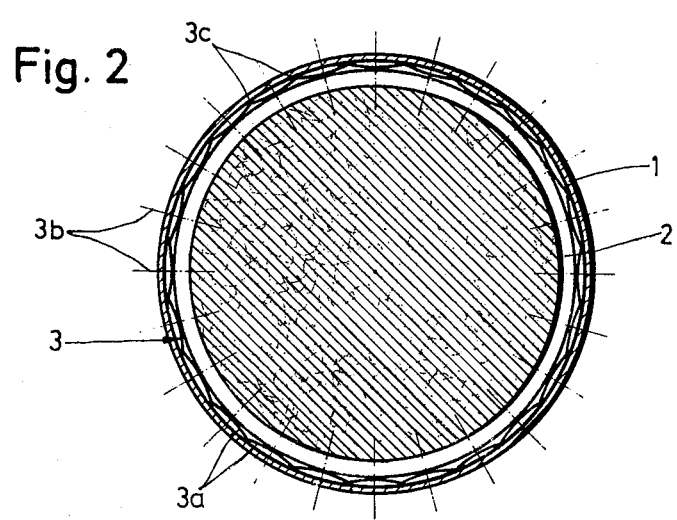
FIG. 2 is a sectional view taken along the line II—II of FIG. 1.

Referring to the drawings in particular, the invention embodied therein, comprises a rocket engine or missile, generally designated 10, with a storage tank formed by an outer wall 1, made of a rigid material, such as steel or plastic. The construction includes a head portion 1a and an opposite end portion 1b, which is adapted to be connected by a suitable fitting to a supply line (not shown) for supplying a propellant 12 to a rocket engine portion (not shown).

In accordance with the invention, a collapsible bellows 2, having an end closure 2a is expandable and contractable within the tubular member 1 and, during contraction, which for example may be effected by the force of a fluid pressure introduced above the wall portion 2a, the propellant 12 is expelled. The invention includes damping means in the form of a thin walled damping jacket 3, which is preferably made of a sheet steel material, and which extends between outer wall 1 and bellows 2, at least over a portion of the length of wall 1.

The damping jacket 3 comprises a plurality of elongated segment portions 3a, which are arranged in side-by-side circumferential arrangement around the bellows. Each portion 3a is arched slightly inwardly in a radial direction and include crests 3b which are applied against the exterior of the surface 2. The crests 3b provide biased engagement areas against the bellows to effect an intensive damping of the bellows by the frictional engagement therewith during its expansion or contraction movements. The segments advantageously include bases 3c which rest against the inside of the outer wall 1.

While a specific embodiment of the invention has been shown and described in detail to illustrate the application of the principles of the invention, it will be understood that the invention may be embodied otherwise without departing from such principles.

What is claimed is:

1. A device for damping the vibrations of bellows, particularly of storage bellows for liquid rocket propellants, comprising a bellows, a damping jacket enclosing the bellows and comprising a plurality of circumferential adjacent segmental portions fixed between said bellows and said jacket and each being arched radially inwardly and having crest areas in biased engagement with said bellows.

2. A device for damping the vibrations of bellows, according to claim 1, including an outer rigid shell, said damping jacket being thin walled and being located between said outer rigid shell and said bellows, each segmental portion having bases resting against said outer rigid shell.

3. A device for damping the operation of bellows, particularly of bellows of storage tanks for rocket engine propellants, comprising a collapsible and extensible bellows, a tubular member surrounding said bellows, and a damping jacket between said tubular member and said bellows and secured to said tubular member and having a plurality of circumferentially adjacent segment portions, each being arched in a radially inward direction and forming crests providing resilient contacting surfaces acting inwardly against said bellows.

4. A device for damping the operation of bellows, according to claim 3, wherein said tubular member comprises a closed tank for propellants, said bellows being expansible and contractable in an axial direction in respect to said closed tank and having a closed end wall with the opposite end of said bellows being adapted to be connected to a connecting line for propellants stored within said bellows.

5. A propellant storage tank, comprising an outer tank shell having a closed end and an opposite end with conduit connecting means for supplying a propellant therefrom, a bellows within said tank being expandable and contractable in an axial direction and adapted to contain a propellant therein, at least a portion of the wall of said tank having a plurality of inwardly fixed circumferentially adjacent segment portions each being arched in a radially inward direction and forming crests providing resilient contacting surfaces acting inwardly against said bellows.

6. A propellant storage tank, according to claim 5, wherein said segmental portions are formed of a thin walled separate member disposed between said bellows and the outer shell wall.

* * * * *